United States Patent
Wu et al.

(10) Patent No.: US 11,725,253 B2
(45) Date of Patent: *Aug. 15, 2023

(54) LOCALIZED HEAT TREATMENT

(71) Applicant: KARSTEN MANUFACTURING CORPORATION, Phoenix, AZ (US)

(72) Inventors: Dave Wu, TaiPei (TW); Tyler Shaw, Paradise Valley, AZ (US); Matthew W. Simone, Phoenix, AZ (US); Yujen Huang, PingTung (TW)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,492

(22) Filed: Dec. 22, 2021

(65) Prior Publication Data

US 2022/0112570 A1 Apr. 14, 2022

Related U.S. Application Data

(63) Continuation of application No. 15/680,958, filed on Aug. 18, 2017, now Pat. No. 11,208,701.
(Continued)

(51) Int. Cl.
*C21D 9/00* (2006.01)
*A63B 53/02* (2015.01)
(Continued)

(52) U.S. Cl.
CPC ............ *C21D 9/0068* (2013.01); *A63B 53/02* (2013.01); *A63B 53/047* (2013.01); *C21D 1/42* (2013.01);
(Continued)

(58) Field of Classification Search
CPC .... C21D 9/0068; C21D 1/42; C21D 2221/00; C21D 1/40; C21D 9/0075; A63B 53/02;
(Continued)

(56) References Cited

U.S. PATENT DOCUMENTS 2,408,190 A 9/1946 Baker
2,611,790 A 9/1952 Koch
(Continued)

FOREIGN PATENT DOCUMENTS

CN 102553185 11/2012
CN 103817279 5/2014
(Continued)

OTHER PUBLICATIONS

PCT International Search Report dated Nov. 20, 2017 from corresponding PCT Application No. PCT/US2017/047608 filed Aug. 18, 2017.

*Primary Examiner* — John A Hevey

(57) ABSTRACT

Embodiments are described herein of a bifurcated heat treatment apparatus and methods for localized heat treatment of a golf club hosel or golf club head. The heat treating method comprises a bifurcated process in which the golf club head is treated in the first heating unit via induction heating and then moved to the second heating unit for convection heating. Both steps are to localize the hosel heat treatment. The heat treatment apparatus may also include a cooling component, such as a heat sink, to ensure the body of the club head remains at the correct temperature during the second heating stage when the hosel is heated in isolation. The overall bifurcated method and apparatus of the localized heat treatment leads to a hosel or golf club head with at least two different hardness values to allow for manipulation of the material without cracking or fracturing.

16 Claims, 4 Drawing Sheets

Related U.S. Application Data

(60) Provisional application No. 62/376,836, filed on Aug. 18, 2016.

(51) Int. Cl.
*A63B 53/04* (2015.01)
*C21D 1/42* (2006.01)

(52) U.S. Cl.
CPC ....... *A63B 53/0466* (2013.01); *A63B 53/0487* (2013.01); *A63B 2053/0479* (2013.01); *C21D 2221/00* (2013.01); *Y02P 10/25* (2015.11)

(58) Field of Classification Search
CPC .............. A63B 53/047; A63B 53/0466; A63B 53/0487; A63B 2053/0479; Y02P 10/25
See application file for complete search history.

(56) References Cited

U.S. PATENT DOCUMENTS

| | | | |
|---|---|---|---|
| 4,169,595 A | 10/1979 | Kaugars | |
| 5,317,121 A | 5/1994 | Katayama et al. | |
| 6,006,805 A | 12/1999 | Karner et al. | |
| 6,814,820 B2 | 11/2004 | Ozbaysal | |
| 6,945,307 B2 | 9/2005 | Tsai | |
| 7,161,124 B2 | 1/2007 | Kisner et al. | |
| 7,520,045 B2 | 4/2009 | Lo | |
| 7,621,824 B2 | 11/2009 | Sano | |
| 8,137,485 B2 | 3/2012 | Seidel | |
| 8,500,573 B2 | 8/2013 | Rick | |
| 8,741,075 B2 | 6/2014 | Imai et al. | |
| 9,078,249 B2 | 7/2015 | Davidson | |
| 9,242,293 B2 | 1/2016 | Seidel et al. | |
| 9,480,891 B2 | 11/2016 | Ono et al. | |
| 9,718,119 B2 | 8/2017 | Zimmerman et al. | |
| 10,260,138 B2 | 4/2019 | Simone | |
| 2005/0009629 A1 | 1/2005 | Chao et al. | |
| 2008/0017281 A1 | 1/2008 | Lin et al. | |
| 2014/0353887 A1 | 12/2014 | Crow et al. | |

FOREIGN PATENT DOCUMENTS

| | | |
|---|---|---|
| JP | 08-038658 | 10/1996 |
| JP | 08-280857 | 10/1996 |
| JP | 2825022 | 11/1998 |
| JP | 2002224249 | 8/2002 |
| JP | 4552066 | 9/2010 |
| TW | 448284 | 8/2001 |
| TW | 514544 | 12/2002 |

LOCALIZED HEAT TREATMENT

CROSS-REFERENCE TO RELATED APPLICATIONS

This is a continuation of U.S. patent application Ser. No. 15/680,958 filed on Aug. 18, 2017, which claims the benefit to U.S. Provisional Patent Application No. 62/376,836, filed on Aug. 18, 2016, which is incorporated fully herein by reference.

BACKGROUND

Fitting a golf iron is a key aspect in a golfers program to generate a repeatable swing for optimal ball striking. Face loft angles are created by bending the golf club head at the hosel. Currently, golf manufacturers use a notch or bend the hosel without a notch for loft adjustments. Notch sizes vary between clubs and new club designs, thereby making the uniform adjustment of clubs difficult. Using a notch to adjust loft angle also reduces the possible configurations of a hosel design. Directly bending the hosel without the inclusion of a notch is a simpler and more reproducible method of adjustment. However, if the hosel material is not properly treated when casted and forged, the loft adjustments can result in fractures or cracks in the hosel of the golf club head. Therefore, there is a need in the art for a more optimal hosel adjustment feature without a structural modification.

BRIEF DESCRIPTION OF DRAWINGS

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

Other aspects of the disclosure will become apparent by consideration of the detailed description and accompanying drawings.

DETAILED DESCRIPTION

Described herein is a bifurcated heat treatment process including a first heating step and a second heating step with little to no cooling time between the first and second heating steps. The second heating step is configured to slowly cool the metal to room temperature. The process allows a manufacturer to meet loft adjustment standards while maintaining a stiffer face hardness. To achieve a club head with two different hardness areas (i.e. the face, cavity, body vs. hosel) having two different hardness values, a bifurcated, or segregated heating process is required wherein localized heat treatments are isolated to the hosel region over at least another portion of the golf club head. For example, as discussed in greater detail below, the impact area of the face can have a hardness value of HRC 38 or greater on the Rockwell scale. The hosel, in contrast, can have a hardness value of HRC 32 or less to enable loft adjustments based upon the specifications of a golfer determined during a fitting process. To achieve two different hardness values within these ranges on a single club head, a bifurcated heat treatment process can include using a furnace apparatus comprising two separate heat curing steps. The present invention achieves the goal of a high strength face having a hardness value greater than HRC 38, and a hosel having a hardness value less than HRC 32, with or without a notch for adjustment.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
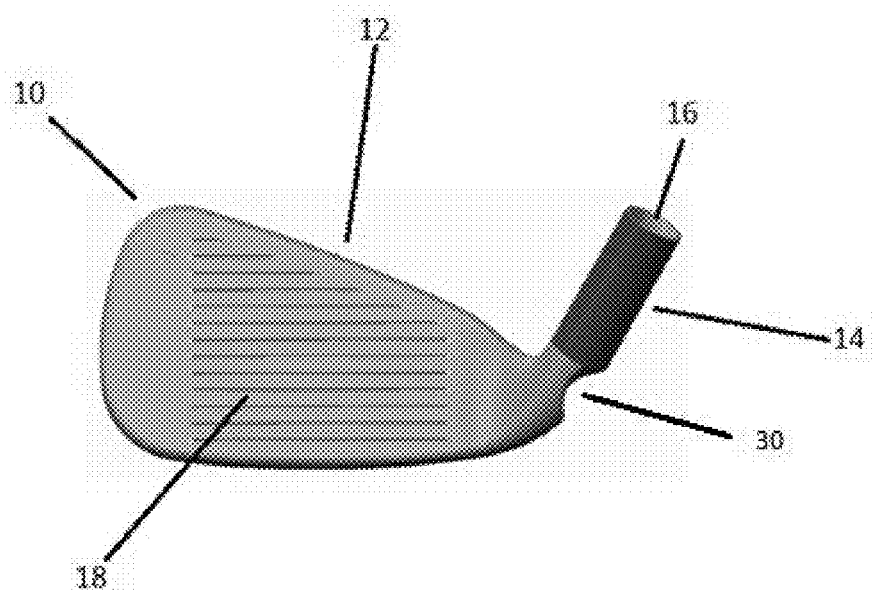
FIG. 1 is a front view of a golf club head.
Figure 2:
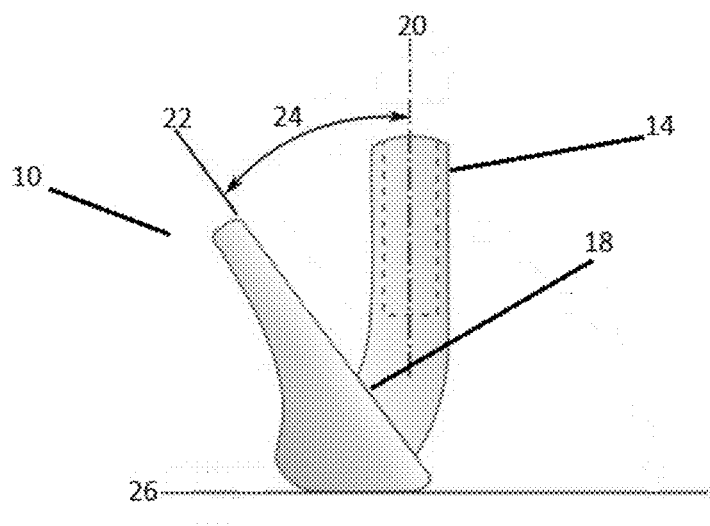
FIG. 2 is a side view of the golf club head.

FIGS. 1-2 illustrate a golf club head 10 at an address position relative to a ground plane 26. The golf club head 10 includes a body 12 and a hosel 14 containing a bore 16 for receiving one end of a golf club shaft (not shown). The hosel 14 includes a hosel plane 20 extending through the center of the bore 16. The body 12 also includes a strike face 18 having a loft plane 22, which extends across the surface of the strike face 18. Further, the hosel 14 of the golf club head 10 can comprise a notch 30 such as the notch described in U.S. Pat. No. 6,186,903, which is incorporated herein by reference. Additionally, the strike face 18 of the golf club head 10 can include one or more grooves such as the grooves describe in U.S. Pat. No. 8,790,193, which is incorporated herein by reference.

One manner for adjusting the loft angle 24 of the club head 10, is bending the club head using the hosel 14 as the focal point. To facilitate the bending process, the hosel 14 can be manufactured to have a different hardness value than that of the strike face 18.

I) Localized Heat Treatment Process

The present invention is directed to a bifurcated heat treating process including a first heating step and a second heating step. The first heating step comprising induction heating. The second heating step comprising electric or conventional heating to achieve the desired hardness values of the club head.

A) Induction Heating

The first step utilizes induction heating, which generates an alternating magnetic field penetrating the club head, creating a current within the metal. The current excites the atoms within the metal resulting in generation of heat. This method requires no contact with the club head and can provide a precise localized area to generate heat in the within the club head. The precision of induction heating can create an uneven molecular structure and result in weaknesses at certain points. Therefore, care is required to provide proper heat treatment to the hosel. This includes, the lack of a cooling step for the club head between the induction heating step to the electrical or conventional heating step.

B) Electrical or Conventional Heating

The second step is a more general application of heat through electric or conventional heating. Electric heating functions by running electricity through a metal comprising a high resistance value, causing the metal to emit heat. The golf club is positioned adjacent to the electric heater and receives heat through convection. The electric heater can also be applied to a localized area of the golf club head. Electrical or conventional heating it is not as precise as induction heating. The electric heater can create a temperature gradient that can slowly cool the club head from the end temperature of the induction heating step to room temperature or a predetermined final temperature of the second heating step over just allowing a heat treated club to cool to room temperature with no additional heat added. The electric or conventional heater allows the molecular structure of the club head to create a uniform structure, growing grain larger grain structures within the matrix of the metal, eliminating and weakness points created during the induction heating step.

C) Overall Heat Treatment Step i) Casting/Forging

Figure 3:
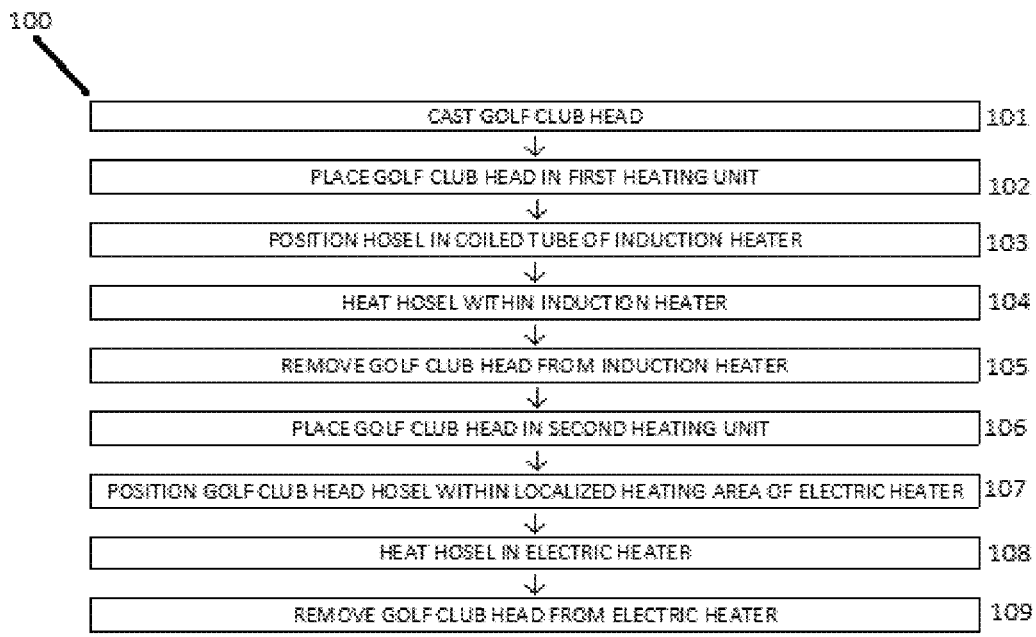
FIG. 3 is a flowchart of a localized heat treatment process.

FIG. 3 illustrates a localized heat treatment process 100 for forming the golf club head 10 having different hardness values for the hosel 14 and the body 12 or strike face 18. With reference to FIG. 3, the localized heat treatment process 100 includes a first step 101 of forming a golf club head 10. The golf club head 10 is formed, for example, by machining, forging, casting, metal injection molding or any other appropriate processes known to those skilled in the art. Exemplary processes for stainless steel club heads includes a casting step, using solvent solution and aging heat treatment, and localized heat treatment for the hosel. Other exemplary processes for carbon steel include a casting step, quench and tempering heat treatment, followed by a partial heat treatment of the hosel 14.

ii) Induction Heating Step

Figure 4:
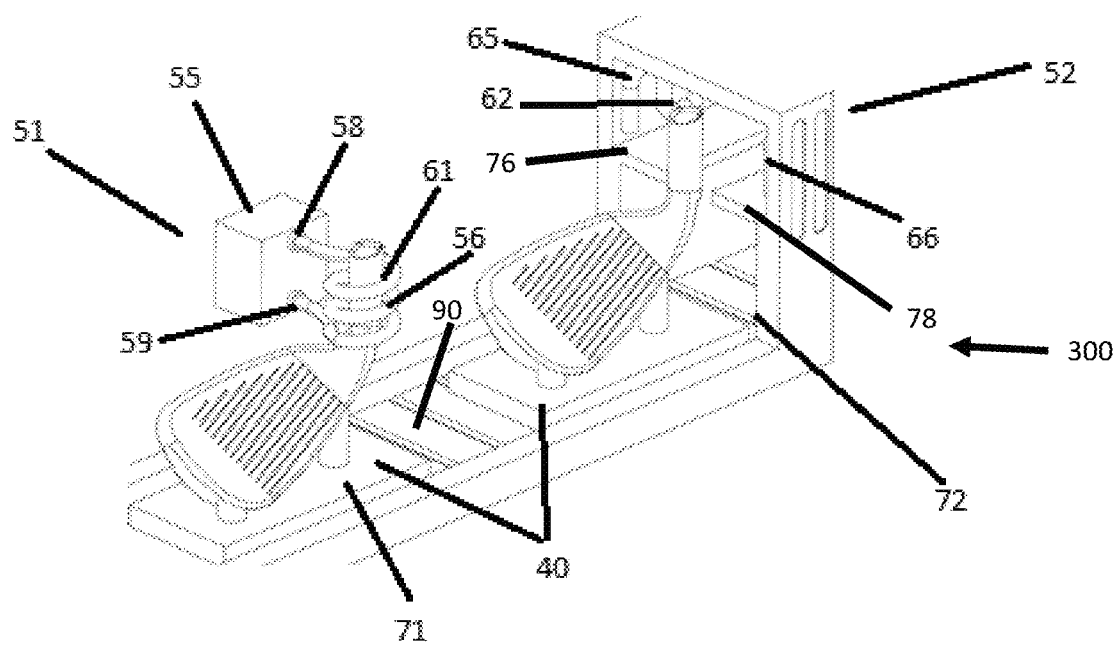
FIG. 4 is an isometric view of an apparatus used during the localized heat treatment process.

The golf club head 10 formed with a method described above can be transferred to the first heat treatment step. With reference to FIGS. 3 and 4, the localized heat treatment process 100 further includes a second step 102 of placing the golf club head 10 in a first heating unit 51 located at a first position 71, and a third step 103 of positioning the golf club head 10 such that the hosel 14 is located within a first localized heating area 61 of the first heating unit 51. In many embodiments, the golf club head 10 can be manually or automatically placed in the first heating unit 51, and manually or automatically positioned such that the hosel 14 is positioned within the first localized heating area 61. Specific devices and automated methods used to position the golf club head 10 are described further below.

Referring again to FIG. 3, the localized heat treatment process 100 includes a fourth step 104 of heating the hosel 14 within the first localized heating area 61 of the first heating unit 51. In many embodiments, the hosel 14 can be heated for approximately 10 minutes. In other embodiments, the hosel may be heated within the range of approximately 5-60 minutes, 5-10 minutes, 5-15 minutes, 5-20 minutes, 10-30 minutes, 30-60 minutes, 1-2 hours, 1-3 hours, or 1-6 hours. In many embodiments, the first localized heating area 61 can range in temperature from approximately 600° C. to 1000° C. In other embodiments, the temperature of the first localized heating area 61 can be approximately 1000° C., 950° C., 900° C., 850° C., 800° C., 750° C., 700° C., 650° C., or 600° C. For example, in one embodiment, the first localized heating area 61 can have a temperature of 800° C. In some embodiments, the body 12 or strike face 18 can comprise components to regulate the temperature of the body 12 or strike face 18 while the hosel 14 is being heat treated, these components are described in more detail below.

iii) Transferring Club Head Step

The golf club head 10 can be removed and transferred to the second heating step. Referring again to FIG. 3, the localized heat treatment 100 further comprises a fifth step 105 of removing the golf club head 10 from the first heating unit 51, and a sixth step 106 including placing the golf club head 10 in a second heating unit 52 at a second position 72 located adjacent to the first position 71. The club head 10 is transferred directly from the first heating unit 51 to the second heating unit 52 with little to no cooling time. As discussed above and in more detail below, the lack of a cooling step in between heating steps promotes the growth of grain structures within the matrix of the material. In many embodiments, the golf club head 10 can be manually or automatically removed from the first heating unit 51, and manually or automatically transferred to the second heating step. Specific devices and automated methods used to position the golf club head 10 are described further below.

iv) Conventional Heating Step

A seventh step 107 comprises positioning the golf club head 10 such that the hosel 14 is positioned within a second localized heating area 62 of the second heating unit 52. In many embodiments, the golf club head 10 can be manually or automatically placed in the second heating unit 52 and manually or automatically positioned such that the hosel 14 is positioned within the second localized heating area 62. Specific devices and automated methods used to position the golf club head 10 are described further below.

Referring to FIG. 3, the localized heat treatment process 100 includes an eighth step 108 wherein the hosel 14 is heated within the second localized heating area 62 of the second heating unit 52. The second localized heating area 62 of the second heating unit 52 can begin at the same temperature as describe for the first heating unit 51 described above. However, the temperature of the second heating unit 52 can decrease over a period of time while the hosel 14 is located within the second localized heating area 62. In many embodiments, the second localized heating area 62 can have a first temperature in the range of 600° C. to 1000° C. and a final temperature in the range of 0° C. to 1000° C. In some embodiments, the first temperature of the second localized heating area 62 can be approximately 1000° C., 950° C., 900° C., 850° C., 800° C., 750° C., 700° C., 650° C., or 600° C. and the final temperature can be approximately 0° C., 100° C., 200° C., 300° C., 400° C., 500° C., 600° C., 700° C., 800° C., or 900° C. This decrease in temperature over a period of time allows the metal to cool at a slower pace creating a larger uniform grain structure within the matrix of the metal. In many embodiments, the hosel 14 can be heated for approximately 10 minutes. In other embodiments, the hosel may be heated within the range of approximately 5-60 minutes, 5-10 minutes, 5-15 minutes, 5-20 minutes, 10-30 minutes, 30-60 minutes, 1-2 hours, 1-3 hours, 1-6 hours, 6-12 hours, or 12-24 hours. For example, in some embodiments, the second localized heating area 62 can begin at a temperature of 800° C. and finish at a temperature of 20° C. and the change in temperature can occur over a 30 minute period. In some embodiments, the body 12 or strike face 18 can comprise components to regulate the temperature of the body 12 or strike face 18 while the hosel 14 is being heat treated, these component are described in more detail below.

v) Removing the Club Head from the Heat Treatment Process

Referring again to FIG. 3, the localized heat treatment process 100 comprises a ninth step 109 including removing the golf club head 10 from the second heating unit. In many embodiments, the golf club head 10 can be manually or automatically removed from the second heating unit 52. Specific devices and automated methods used to position the golf club head 10 are described further below.

II) Resulting Hardness/Grain Structure

Figure 7:
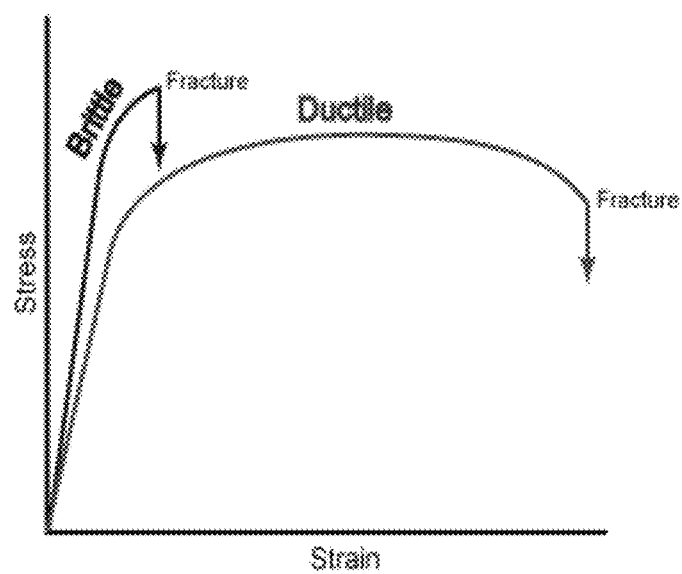
FIG. 7 is an exemplary stress-strain curve illustrating the relationship between brittle and ductile materials.

As a result from the localized heat treatment process 100 describe in detail above, a golf club head 10 is created having two different hardness areas, (i.e. the strike face 18, cavity, body 12 vs. hosel 14) having two different hardness values. The localized heat treatment process 100 discusses using a bifurcated heat treatment process wherein the first heating step applies a precise heat treatment to the hosel 14 and a direct transition with little to no cooling time to the second heating step. The second heating step involves a temperature gradient over a predetermined time period to slowly cool the metal. Slowly cooling the metal promotes the growth of uniform large grain structures within the matrix of the metal. The larger the grain structures within a metal, the more ductile that metal is. Ductile is a term used to describe the ability to permanently or plastically deform a material before the material fractures or cracks. This means that the hosel 14 created through the localized heat treatment process 100, having a large grain structure and a high ductility, is less likely to fracture, or crack when compared with a brittle material. Brittle materials having a small grain structure can result from rapidly cooling the metal or allowing the metal to cool at a constant room temperature have higher maximum strengths but tend to fracture or crack rather than bend. A brittle material is proven to be beneficial for the strike face 18 of the club head 10 as it has a high strength when impacting the ball and will not bend. FIG. 7 illustrates an exemplary stress-strain curve, which illustrates the relationship between brittle and ductile materials. The brittle material has a greater strength, but fractures rather than bends when a stress greater than its yield strength is applied, as mentioned this is beneficial for a strike face 18. A ductile material has a large region wherein the metal will bend (plastic deformation) prior to fracturing, beneficial to for the hosel 14 allowing a manufacturer to apply a specified loft without fracturing the metal.

As describe above it is beneficial to have a softer more ductile hosel 14, and a harder more brittle strike face 14. The localized heat treatment process 100 focuses the treatment on the hosel 14 creating a club head 10 having a softer more ductile hosel 14, and a harder more brittle strike face 18. This process 100 can be applied to any type of metal club head. In many embodiments, the golf club head 10 can comprise a steel alloy, a carbon steel alloy, a titanium alloy, a composite or any other suitable material. In other embodiments the club head can comprise a 17-4 steel alloy, a 431 steel alloy, a carbon steel alloy, or a chromium-molybdenum steel alloy. Further, the hardness of the finished materials can vary. In many embodiments, the process can create a hosel 14 having a hardness value of HRC 32 or below on the Rockwell scale and a strike face 18 having hardness value of HRC 38 or above on the Rockwell scale. In other embodiments, the hosel 14 can have a hardness value of HRC 32, HRC 30, HRC 28, HRC 26, HRC 24, HRC 22, HRC 20, or HRC 18, while the strike face 18 can have a hardness value of HRC 38, HRC 40, HRC 42, HRC 44, HRC 46, HRC 48, or HRC 50. For example, in some embodiments, the hosel can have a hardness value of HRC 24, and the strike face 18 can have a hardness value of HRC 42. Table 1 illustrates the desired temperatures for a variety of exemplary metals to reach the desired hardness level. In many embodiments, referring to Table 1 below, a 17-4 steel alloy can be heated in the temperature range of approximately 740-860° C., 740-780° C., 780-820° C., or 820-860° C. Further, in many embodiments, referring to Table 1 below, a 431 steel alloy, a carbon steel alloy, or a chromium-molybdenum steel alloy can be heated to a temperature between 640-800° C., 640-680° C., 680-720° C., 720-760° C., or 760-800° C.

TABLE 1

Exemplary club head materials, heat treatment temperatures, and hardness values

| Materials | Temperature (° C.) | Hosel Hardness (HRC) |
| --- | --- | --- |
| 17-4 Steel Alloy | 740~860 | 22~34 |
| 431 Steel Alloy | 640~800 | 16~28 |
| Carbon Steel | 640~800 | 10~25 |
| Cr—Mo Steel Alloy | 640~800 | 10~25 |

Having a softer more ductile hosel 14 allows the manufacturer the ability to more consistently and confidently apply a specified loft to a golfer's clubs. The manufacturer may apply a loft angle 24 to a club head by bending the club head 10 at a point on the hosel 14. With further reference to FIGS. 1 and 2, the golf club head 10 comprises a loft angle 24 defined as the angle between the hosel plane 20 and the loft plane 22. In many embodiments, the loft angle 24 of the golf club head 10 can range from 10 degrees to 80 degrees. In some embodiments, the loft angle 24 can be less than or equal to approximately 80 degrees, 75 degrees, 70 degrees, 65 degrees, 60 degrees, 55 degrees, 50 degrees, 45 degrees, 40 degrees, 35 degrees, 30 degrees, 25 degrees, or 20 degrees. For example, in other embodiments, the loft angle 24 can be 60 degrees.

III) Localized Heat Treatment Apparatus

An apparatus comprising a first heating unit 51 and a second heating unit 52 can be used to perform the localized heat treating process 100, creating the golf club head 10, describe above. With reference to FIG. 4, an apparatus 300 is illustrated, which can be used to perform the localized heat treatment process 100. The apparatus 300 comprises a first heating unit 51 located at a first position 71 configured to perform a first type of heat treatment and a second heat treatment unit 52 located at a second position 72 adjacent to the first heat treatment unit 51 and configured to perform a second type of heat treatment. Both, the first and the second heat treatment units 51,52 include localized heat areas focused on the hosel 14 of the golf club head 10.

With additional reference to FIG. 4, the first heating unit 51 can be an induction heater comprising a power supply 55 and a coiled tube 56. The coiled tube 56 can be coupled to the power supply 55 at a first end 58 and a second end 59. The area inside the coiled tube 56 can define the first localized heating area 61. The power supply 55 can be configured to send an electric current ranging from 50 to 450 kHz through the coiled tube 56. In many embodiments, the coiled tube 56 can comprise a copper wire. In other embodiments, the coiled tube 56 can comprise a different metal having a low resistance, such as silver, gold, aluminum or any other suitable metal. In other embodiments, the first heating unit 51 can comprise an electric heater, a laser heater, a batch heater or any other suitable heater known to a person skilled in the art.

The second heating unit 52 can be an electric heater comprising a first heating element 65 and a second heating element 66. The first heating element 65 and the second heating element 66 are parallel and spaced apart from each other, the area between the two heating elements 65,66 defines the second localized heating area 72. In some embodiments, the second heating unit 52 can comprise a first separation piece 76 and a second separation piece 78. The first and second separation pieces 76,78 can extend perpendicularly and be positioned below the first and second heating elements 65,66 further defining the second localized heating area 62. In many embodiments, the heating elements are comprised of a nichrome material. In other embodiments, the heating elements may comprise a different material having a high resistance, such as a PTC rubber, PTC ceramic elements, cupronickel or any other material having a high electrical resistance. In other embodiments, the second heating unit 52 can comprise an induction heater, a laser heater, a batch heater or any other suitable heater known to a person skilled in the art.

In other embodiments, the apparatus 300 can comprise 3 or more heating units. Further, the heating units can be configured to receive a plurality of club head 10 at a time.

IV) Devices and Automated Methods to Position the Golf Club Head

As discussed above the localized heat treatment process 100 can include the golf club head 10 being manually or automatically placed in the second heating unit 52 and manually or automatically positioned such that the hosel 14 is positioned within the second localized heating area 62. Different devices can be used to accomplish these steps. With Reference to FIGS. 3 and 4, in some embodiments, the second step 102 can comprise placing the golf club head 10 in a device 40. The third step 103 can comprise placing the device 40 in the first heating unit 51. Additionally, the fifth step 105 can comprise removing the device from the first heating unit, the sixth step 106 can comprise placing the device 40 in the second heating unit 52, and the seventh step 107 comprising positioning the hosel 14 in the second localized heating area 62 is no longer necessary as the device is configured to position the hosel 14 in the correct position. In some embodiments, the device 40 utilizes a clamping mechanism. In other embodiments, the device can use a restraining mechanism, such as a strapping mechanism, a pinching mechanism, a magnetic mechanism or any other suitable restraining mechanism.

In yet another embodiment, the device 40 can be coupled to a conveyor belt 90 configured to transfer the device from the first heating unit 51 to the second heating unit 52. In some embodiments, the conveyor belt will move the golf club head 10 into the first and second heating units 51,52 and remain stationary for the allotted heating time period. In other embodiments, the first heating unit 51 will move with the conveyor belt for a pre-determined distance corresponding with the heating time required for the hosel 14 to reach the desired hardness. Further, the second heating unit 52 can comprise an elongated localized heating area 62 wherein there is a temperature gradient across its length. The first end of the second heating unit 52 can be a first temperature and the second end of the second heating unit 52 can be the final temperature, discussed above. The conveyor belt 90 can move the device 40 including the golf club head 10 along the length of the second heating unit 52 at a certain pace corresponding with the heating time required for the hosel 14 to reach the desired hardness.

V) Cooling Components for Golf Club Head Body or Strike Face

Figure 5:
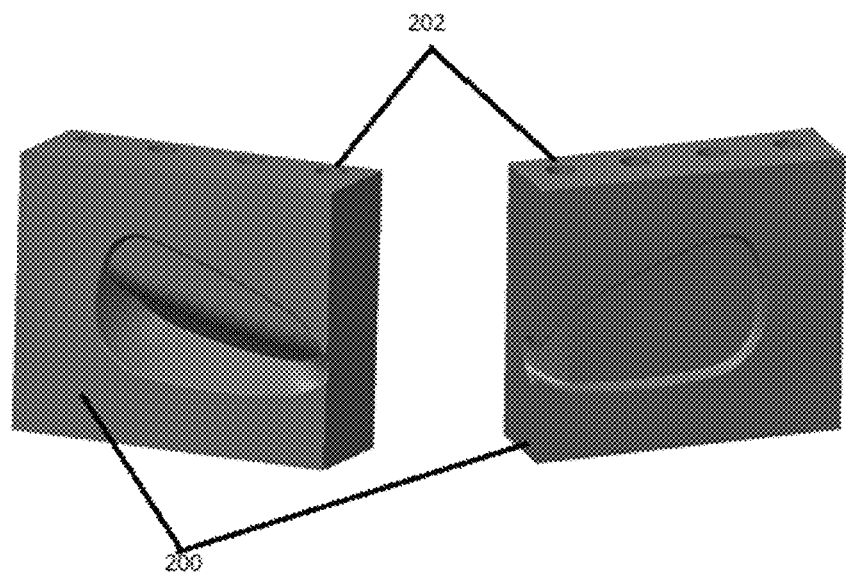
FIG. 5 is a split view of a cooling block.

As discussed above, the heat treating process 100 can include components to regulate the temperature of the body 12 or strike face 18 while the hosel 14 is being heat treated. Referring to FIG. 5, in one embodiment, the body 12 can comprise a cooling block 200 configured to transfer heat away from the body 12 during the localized heat treatment process 100. The cooling block 200 is molded to cover the entire body 12 and is comprised of a material having a high thermal conductivity. In many embodiments, the cooling block 200 can be comprised of copper, silver, aluminum or any other suitable material. For example, in some embodiments, the cooling block 200 is comprised of copper. Additionally, in many embodiments, the cooling block 200 can comprise channels 202 configured to have a coolant pumped through the cooling block 202 to further increase the quantity of heat being transferred from the body 12. In many embodiments, the coolant can be water, air, hydrogen, freon or any other suitable coolant. For example, in some embodiments, the coolant is water.

Figure 6:
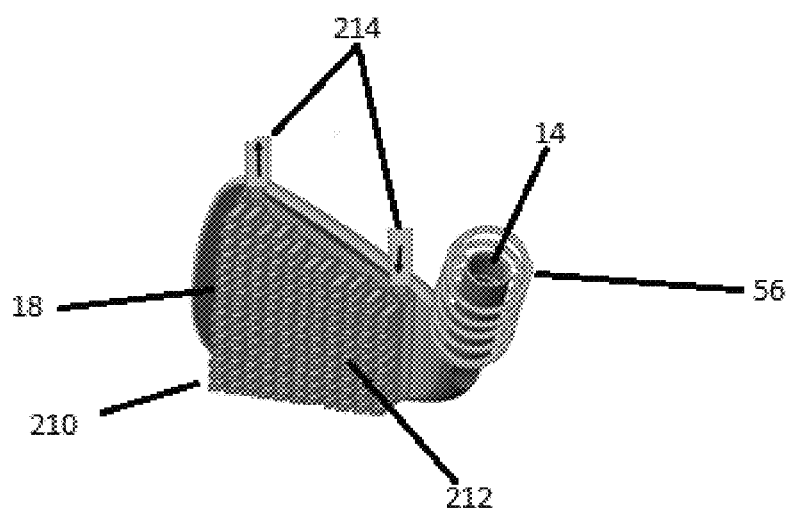
FIG. 6 is a front view of the golf club head having a heat sink.

Referring to FIG. 6, in another embodiment, a heat sink 210 is illustrated. The heat sink 210 is configured to be removably coupled to the strike face 18 during the localized heat treating process 100. While the hosel 14 is being heat treated to achieve a desired hardness level the heat sink 210 can be positioned on the strike face 18 to further displace unwanted heat from the strike face 18. Additionally, the heat sink 210 can have a plurality of fins 212 extending opposite the strike face 18. The fins 212 can aid to remove heat by creating a greater surface area for a convection process to occur. In many embodiments, the fins can have circular, triangular, rectangular or any other suitable shape. For example, in some embodiments, the fins can have a circular cross-section. The fins 212 can comprise any height within the range of 0.01" to 5" from the surface of the heat sink 210. Further, the heat sink 210 can comprise a circulating system 214 configured to have a coolant pumped through the heat sink 210 to increase the effect that the heat sink 210 has on displacing unwanted heat from the strike face 18. In many embodiments, the coolant can be water, air, hydrogen, freon or any other suitable coolant. For example, in some embodiments, the coolant is water.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described in connection with an iron-type golf club, the apparatus, methods, and articles of manufacture described herein may be applicable to other types of golf club such as a driver-type golf club, a fairway wood-type golf club, a hybrid-type golf club, a wedge-type golf club, or a putter-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Various features and advantages of the disclosure are set forth in the following claims.

The invention claimed is:

1. A method for heat treating a golf club comprising:
casting a golf club head configured to undergo a heat treatment comprising an apparatus;
    wherein the apparatus defines a first heating unit at a first position and a second heating unit at a second position adjacent the first position, a conveyor belt, a hosel positioning device, and a heat sink;
placing the golf club head in the first heating unit, wherein the first heating unit is an induction heater comprising a first localized heating area;
positioning the golf club head using a hosel positions device that is coupled to a conveyor belt, such that a hosel of the golf club head is located inside the first localized heating area within a coiled tube and a body of the golf club head is located outside of the first localized heating area of the induction heater;
heating the hosel using the coiled tube comprising a first end and a second end coupled to a power supply within the first localized heating area of the induction heater for approximately 10 minutes;
removing the golf club head from the induction heater;
transferring the hosel positioning device immediately by means of a conveyor belt from the first heating unit at the first position to a second localized heating area at the second position;
moving the golf club head to the second heating unit by means of the conveyor belt, wherein the second heating unit is a resistive heater comprising the second localized heating area;
positioning the golf club head using the hosel positioning device such that the hosel of the golf club head is located within the second localized heating area of the resistive heater and the body of the golf club head is located outside the second localized heating area;
heating the hosel within the second localized heating area of the resistive heater for approximately 10 minutes; and
removing the golf club head from the resistive heater.

2. The method for heat treating of claim 1 wherein, the first and second heating units have temperature ranges of approximately 740-860° C. for a 17-4 steel alloy or approximately 640-800° C. for a 431 steel alloy, carbon steel alloy, or Chromium-Molybdenum steel alloy.

3. The method for heat treating of claim 1 wherein, the resistive heater of the second heating unit further comprises:
a first heating element; and
a second heating element positioned parallel to the first heating element wherein the second localized heating area is located between the first heating element and the second heating element.

4. The method for heat treating of claim 1 wherein, the resistive heater of the second heating unit further comprises:
a first separation piece extending perpendicularly and below a first heating element; and
a second separation piece extending perpendicularly and below a second heating element;
wherein:
the hosel positioning device is configured to position the hosel of the golf club head between the first and second heating elements and above the first and second separation pieces such that the body of the golf club head is separated from the hosel and the first and second heating elements.

5. The method for heat treating of claim 1 wherein, a first heating element and a second heating element are comprised of a material selected a group consisting of a PTC rubber, a PTC ceramic element, and cupronickel.

6. The method for heat treating of claim 1 wherein, the coiled tube is comprised of copper.

7. The method for heat treating of claim 1 wherein, the power supply sends an electric current ranging from 50 to 450 kHz through the coiled tube.

8. The method for heat treating of claim 1, wherein the first heating unit moves from a first point to a second point at the same pace as the conveyor belt, the second heating unit comprising an extended length.

9. The method for heat treating of claim 1, the second heating unit comprises a temperature gradient across length of the heater.

10. The method for heat treating of claim 1 wherein, the hosel positioning device is a clamping device.

11. The method for heat treating of claim 1 wherein, the heat sink is configured to be removable coupled to the body of the golf club head in the first heating unit and the second heating unit.

12. The method for heat treating of claim 1 wherein, the heat sink comprises a channel configured have a coolant pumped through the channel.

13. The method for heat treating of claim 10 wherein, the heat sink comprises a circulating system configured have a coolant pumped through the heat sink.

14. The method for heat treating of claim 10 wherein, a coolant is from a group consisting of water, air, hydrogen, and freon.

15. The method for heat treating of claim 1 wherein, the heat sink comprises fins.

16. The method for heat treating of claim 15 wherein, the fins have a shape selected from a group consisting of triangle, circular, and rectangular.

* * * * *